3,041,751
DITCHER APPARATUS
Robert C. Chattin, 2400 Bannock St., Boise, Idaho
Filed Oct. 22, 1958, Ser. No. 768,865
5 Claims. (Cl. 37—98)

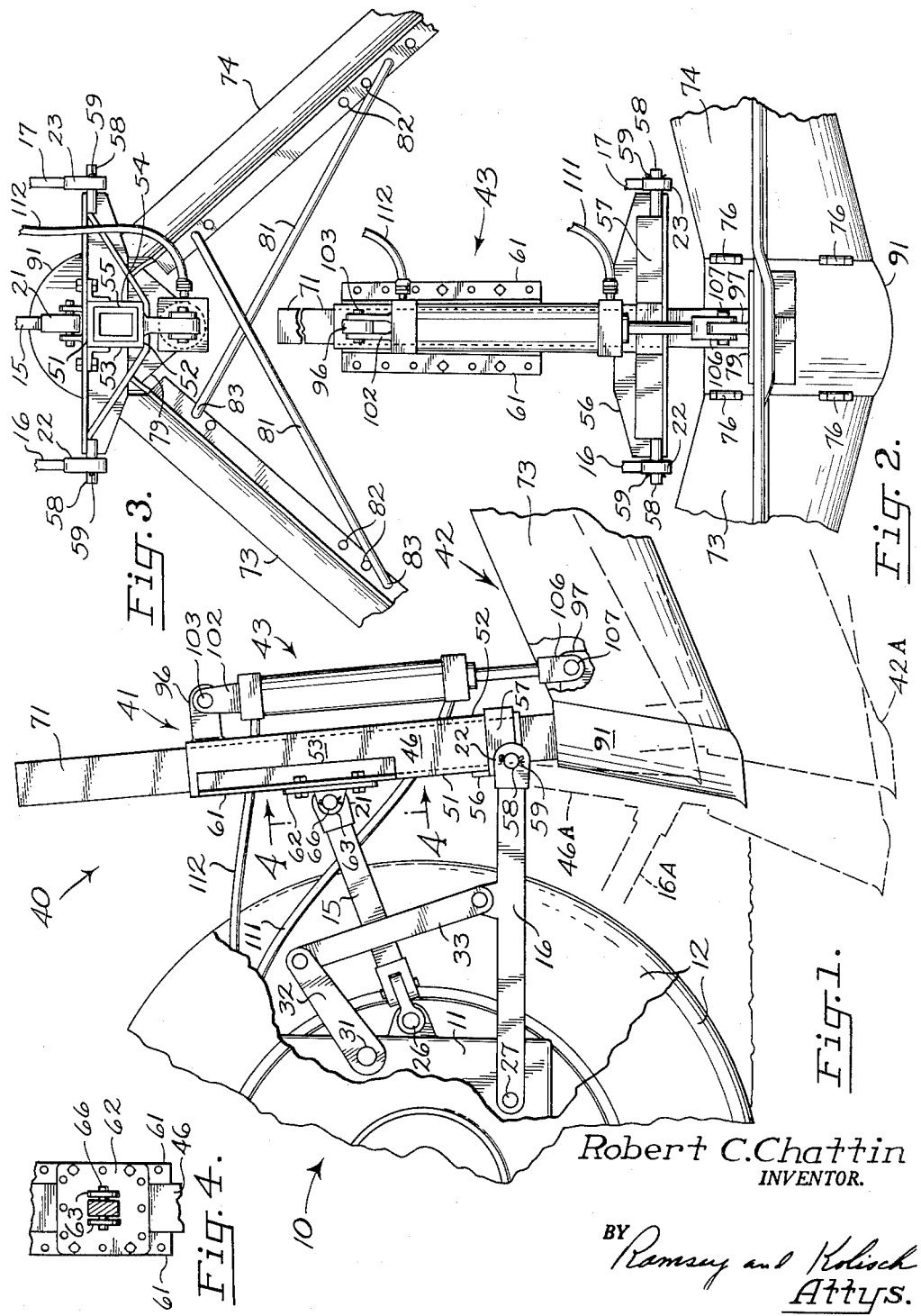

This invention relates to ditcher apparatus, and more particularly to ditcher apparatus of the type that may be used in the construction of irrigation ditches, drainage ditches and the like. The invention features an improved construction that enables the production of a wide variety of ditch sizes and profiles, and that also imparts a high degree of manuverability to a tractor equipped with the tool. The ditcher tool is readily lifted from the end of a ditch, and then lowered to its old position, preparatory to making a new ditch on a succeeding pass of the same profile, without the necessity of making repeated adjustments in tool setting.

A principal object of the invention is to provide an improved construction for a ditcher of the type that is carried directly on the hitch arms of the tractor and is raised and lowered by the hitch arms, that is readily set to dig either shallow or deep ditches while at the same time building up suitable banks along the sides of the ditch, and is easily lifted and cleared of the ground when making a turn or reaching the end of a ditch. Thus, the ditcher is ideally suited to dig or clear the main, lateral, and border ditches of an irrigation system.

In general terms, the apparatus of this invention comprises a tool frame or carrying unit portion secured by coupler means to the hitch arms of a conventional tractor. The tool frame includes wall portions defining an elongated, upright guideway that slidably supports an elongated tool beam portion. Carried at the base of the tool beam is the ditcher implement proper, comprising a pair of divergent wing or moldboard sections inclining laterally outwardly and upwardly from their forward set of ends. Operatively interposed between the implement portion of the ditcher apparatus and the tool frame is an expansible-contractible fluid jack, employed to fix in various adjusted positions the position of the moldboard sections relative to the tool frame or carrying unit.

An important consideration in irrigation ditches is the height of the side banks that border the opposite sides of a ditch. Irrigation water, if it is to flow over the ground, must be carried in a ditch at an elevation higher than ground elevation. Thus, to prepare suitable banks when making a shallow ditch, a relatively wide ditch bottom is required, in order that enough dirt may be obtained to build the requisite bank heights. With a deeper ditch, the dirt for building the bordering banks may be collected from the deeper soil penetration, and a ditch bottom need not be so wide. Thus, in digging shallow or deep ditches, the divergence of the ground-contacting portions of the wings or moldboard sections is of prime importance.

By the above-described construction, shallow or deep ditches are readily dug and adjustment in the ground-contacting portions of the wings may be done entirely from the operator's seat of a tractor. In a conventional tractor, the hitch arms of the tractor are pivoted to the tractor frame structure, and raising and lowering of the hitch arms shifts the angular position of a tool connected to the arms relative to the ground. The organization of this invention employs this angular shifting movement of the arms as a means for setting the angular position of the wings of the ditcher implement relative to the ground, and the angle of the nose of the ditcher implement (and thus the "suction angle" of the ditcher). Once the angular position is set, the ditcher implement may be lowered into the ground by adjustment of the implement vertically in the guideway provided by the tool frame portion. When the end of a ditch is reached, the ditcher implement may be lifted from the ground without varying its angular setting, and thus without affecting the profile of the ditch next prepared.

Further, the fluid jack interposed between the implement proper and the frame may be used to produce requisite down pressure on the ditcher. The hitch arms of many tractors are freely pivotable between limiting positions. Thus, ditchers connected to these tractors have often depended solely on the weight of the tool and tool suction to produce soil penetration. This arrangement is not always advantageous, however. In the construction of this invention, the jack may be used to produce a positive down pressure on the ditcher, and thus produce soil penetration in soil conditions which resisted penetration using old types of ditcher constructions.

Thus it is another object of the invention to provide versatile ditcher apparatus wherein the angular position of the wings of the ditcher with respect to the ground and the lead angle of the nose may be controlled using the hitch arms of a tractor.

A further object is to provide a ditcher that includes means for producing down pressure on the ground cutting elements of the ditcher regardless of the setting of the hitch arms carrying the tool.

Another object is to provide a ditcher of the type contemplated that is simple and is made up of relatively few component parts, but is sturdy and rugged in construction and thus well adapted for farm and ranch use.

These and other objects and advantages are attained by the invention described hereinbelow in conjunctoin with the accompanying drawings wherein:

FIG. 1 is a side elevation of rear end portions of a tractor showing ditcher apparatus constructed according to an embodiment of the invention attached to the hitch arms of the tractor;

FIG. 2 is an end elevation of the ditcher apparatus in FIG. 1, viewing the apparatus from the rear or from right to left in FIG. 1;

FIG. 3 is a top, plan view, looking down at the apparatus in FIG. 1; and

FIG. 4 is a view along the line 4—4 in FIG. 1.

Referring now to the drawings, 10 indicates generally the rear end portions of a conventional tractor. The tractor comprises a rear axle and differential housing 11 supporting at opposite sides of the tractor, a pair of laterally-spaced traction wheels 12.

Mounted at the rear of the tractor and extending rearwardly thereof are three hitch arms indicated at 15, 16, and 17 (hitch arm 17 being obscured from view in FIG. 1). These hitch arms are provided with coupler means, such as eye fasteners 21, 22 and 23, affixed to the rear ends of the hitch arms. The three hitch arms make up a three-point hitch system common in commercial farm tractors.

Hitch arms 15, 16, and 17 are pivoted to the tractor frame structure by pivot connections 26 for arm 15 and pivot connections 27 for arms 16, 17. And, as is conventional, means is provided for raising some or all of the hitch arms. Thus, in the embodiment illustrated, each of the lower arms 16, 17 is connected to a common rock shaft 31 by a lever arm 32 and a link 33, and the non-pivoted or front ends of the arms 32 are fixed to this shaft. Shaft 31 is rotated when it is desired to adjust the height of the rear ends of the arms, and conventional power-actuated means (not shown) is provided for rotating shaft 31. With some tractors the position of the power-actuated hitch arms remains fixed after vertical adjustment of the nonpivoted ends of the arms, although with other tractor constructions the power-actuated arms are free to pivot upwardly from their various adjusted positions to an upper limit position for the arms.

Connected to the rear ends of the hitch arms and supported by the hitch arms is the ditcher apparatus embodying my invention, indicated generally at 40. The ditcher apparatus comprises a tool frame portion or carrying unit designated generally at 41, a ground-engaging ditcher implement shown generally at 42 carried at the base of frame portion 41, and an expansible, double-acting fluid motor or jack 43 used to position implement 42 relative to frame portion 41.

Frame structure 41 comprises a hollow tube section 46 of rectangular cross section, having front and rear walls 51, 52, and side walls 53, 54 defining an elongated, upright tunnel or guideway 55.

Welded to the base of tube section 46 and extending transversely thereof is an elongated angle iron plate portion 56, notched at its center to accommodate section 46. Plate portion 56 is trussed to the tube section by a yoke piece 57, that has its ends welded to the plate portion and surrounds the lower portion of section 46 intermediate its ends. At each end of plate portion 56 is a pin segment 58 secured to the plate portion and yoke piece 57. These pin segments fit within the eyes of eye fasteners 22, 23 when attaching the ditcher assembly to the rear of the vehicle. Cotter members 59 extend through the ends of the pin segments 57 to secure the connection.

Welded to tube section 46 at the top end thereof are a pair of flange members 61, one along each side of section 46. A plate 62 having outwardly-projecting ear portions 63 affixed thereto is secured by nut and bolt assemblies to flange members 61. Ear portions 63 have suitable pin-receiving apertures formed therein receiving a pin 66 when attaching top hitch arm 15 (preferably adjustable in length) to the ditcher apparatus. The nut and bolt assemblies accommodate detachment of plate 62 and turning of the plate ninety degrees thereby to change the ear portions from a vertical to a horizontal position. This enables the ditcher apparatus readily to be attached to a hitch construction wherein the top hitch arm has a fastener with an eye extending therethrough in a vertical direction.

Concerning now the ground-engaging portion of the apparatus, mounted for sliding movement up and down in the guideway defined by the front, rear, and side walls of tube structure 46 is an elongated beam or bar 71. This is of rectangular cross section, and complements the rectangular interior of section 46. Thus, relative rotation of parts 46, 71 is prevented. Beam 71 has a length substantially in excess of the length of tube structure 46, enabling the beam to be moved up and down and while still being supported firmly in the tube structure.

A nosepiece 91 fixed to the lower end of beam 71 has a pair of divergent wings or moldboard sections 73, 74 associated therewith. The wing sections are pivotally joined to the nosepiece by hinges 76, respectively. The nosepiece 91 has an understructure 79 integral therewith extending transversely and rearwardly thereof. The wing sections 73, 74 diverge from each other and are inclined upwardly from their hinged connection with the nosepiece. The wing members constitute moldboard sections because they have concavely-curved outer faces which are operable to cut under and then to fold over a layer of earth as the ditcher is drawn along the ground.

The spacing between the divergent ends of the wing members is fixed in different adjusted positions by means of connector rods 81 interposed between the two wing members (see FIG. 3). The rods have hooked-over ends insertable into apertures 82 formed in flanges provided along the inner faces of members 73, 74. The pivot connections 76 enable the wing members to swing during their adjustment.

The front profile of the nosepiece 91 is upright but slants obliquely forwardly, as best seen in FIG. 1, and defines the "suction angle" or lead angle of inclination for the ditcher. Thus, dropping or raising the rear ends of the moldboard sections also effects a change in the suction angle.

Hydraulic jack 43 is operatively interposed between tube section 46 and the ground-cutting implement, and is used for raising or lowering the ground-cutting implement relative to the tool frame, and setting the same in fixed positions of adjustment. Thus, affixed by welding to rear wall 52 of section 46, near the top end thereof, and projecting to the rear is an ear 96. In a similar manner, affixed to understructure 79 and extending rearwardly from the structure is another ear 97. These ears mount the opposite ends of jack 43. The connection between the top end of jack 43 and ear 96 is made through a clevis section 102 secured to the top of the cylinder portion of the jack and a pin 103 connecting the clevis and ear 96 that is inserted through suitable registering apertures provided in the two parts. The base of jack 43 is secured in place in a similar manner, through a clevis member 106 secured to the piston rod portion of the jack and a pin 107 connecting the clevis member and ear 97.

Conduits 111, 112 lead to opposite ends of the cylinder portion of jack 43, and provide pressure fluid flow and discharge flow for the jack. A conventional valve (not shown) is used to control flow through conduits 111, 112, respectively, whereby fluid under pressure may be admitted to one end or the other of the cylinder portion of the jack and discharged from the opposite end.

In operating the apparatus of the invention, the suction angle defined by the nosepiece and the upward inclination of the rear ends of the wing members may be set by appropriately positioning the hitch arms. This determines the ditch profile. For a given small- or medium-sized ditch of a given profile, this setting of the hitch arms may remain constant. Soil penetration may be produced entirely by elongated of jack 43. When the end of a ditch is reached, the wing members may be lifted clear of the ground by contraction of jack 43.

Thus, it will be noted with reference to FIG. 1 that the wing members shown in solid outline are lifted clear of the ground by jack 43 which is substantially completely contracted. Extension of jack 43 lowers the wing members to the position indicated in dotted outline at 42A. In passing between the two positions, the angular position of the ground-engaging implement relative to the ground remains constant.

If it is desired to build a ditch with a wider base having side banks spaced a greater distance apart, it is an easy matter to swing the hitch arms downwardly as, for example, to the position of the hitch arms shown in dotted outlines in FIG. 1, indicated at 16A. In this position of the hitch arms, the position of tube section 46 changes to that which is shown in dotted outline in FIG. 1, at 46A and the position of implement 42 relative to the ground changes to the position shown in dotted outline at 42A. In this position of implement 42, wings 73, 74 move to a position that is more nearly horizontal than the position they previously had. Since the wings of the implement diverge, the result of such angular shifting of implement 42 is to set the implement for digging a wider base in a ditch.

Adjustment in the spacing between the divergent ends of the blades offers a further means for varying ditcher contour. Obviously when the divergent ends are set farther apart from each other, a wider ditch results.

In the event that the apparatus is used with tractors wherein for different adjusted positions no down pressure may be exerted on the hitch arms, the hitch arms may be elevated to their upper limit position, and jack 43 fully extended thus to cause lowering of the ditcher implement. In this instance, expansion of jack 43 has the effect of producing positive down pressure on the ditcher implement, with accompanied downward movement of the ditcher implement into the ground. This is a decided advantage.

It will be noted that in many applications, adjustment of the ditcher implement may be made without raising or lowering of the hoist arms, which is a decided advantage, as thus the ditcher blades may be set at a constant angular position relative to the ground. Further, the hitch apparatus is ideally suited for making short ditches, as the apparatus is readily lifted from the ground to permit turning of the tractor when making a new pass.

It is claimed and desired to secure by Letters Patent:

1. Ditcher apparatus adapted to be suspended on the hitch arms of a tractor comprising, in operative position, a substantially upright tool frame portion and means for securing the same to the hitch arms of such a tractor, an elongated beam portion slidably and nonrotatably mounted on the tool frame portion for reciprocal movement up and down thereon, a ditcher implement having a pair of elongated wings with convergent front ends and divergent rear ends secured to said beam portion and carried at the base thereof, said wings being positioned with the convergent ends of the wings spaced adjacent to the base of said beam portion and with the wings extending rearwardly and inclining laterally outwardly and upwardly from said convergent ends, and a remotely-controlled, elongated, double-acting fluid jack operatively connected at one end to said frame portion and at its other end to said implement at a point near the convergent ends of the wings, expansion or contraction of said jack being operable to adjust along a linear path the position of said implement relative to said tool frame.

2. The apparatus of claim 1 wherein the ditcher implement further comprises means for adjusting and then fixing in various adjusted positions the degree of divergence of said wings.

3. The combination of a tractor having pivotally-mounted hitch arms at a rear end thereof, said hitch arms pivoting in substantially vertical planes about axes extending transversely of the tractor and having coupler means at their nonpivoted ends for attachment to a tool, and a ditcher tool coupled to said hitch arms and supported by the hitch arms for movement up and down with the nonpivoted ends of the arms, said hitch arms being constructed to swing the tool attached thereto about an axis extending transversely of the tractor on pivotal movement of the arms, said ditcher tool comprising a tool frame portion detachably fixed to the arms for movement up and down therewith, said tool frame portion having an elongated substantially upright guideway which is shiftable in elevation and in angular position relative to the ground on pivotal movement of nonpivoted ends of the hitch arms, a ground-engaging tool portion, the latter having an elongated guide bar slidably mounted in said guideway for reciprocal movement up and down relative thereto and a pair of opposed elongated wings secured to said guide bar and carried at the lower end thereof, said wings having convergent and divergent ends and being mounted with the convergent ends adjacent the base of said guide bar and the divergent ends carried rearwardly, upwardly, and laterally outwardly of the convergent ends, and a remotely-controlled, double-acting fluid jack operatively connected to and interposed between said ground-engaging tool portion and said tool frame portion.

4. The combination of claim 3 which further comprises means interposed between the wings for adjusting and fixing in various adjusted positions the amount of divergence of said wings.

5. The combination of a tractor having pivotally-mounted hitch arms at the rear end thereof, said hitch arms pivoting in substantially vertical planes about axes extending transversely of the tractor and having coupler means at their nonpivoted ends for atachment to a tool, and a ditcher tool coupled to said hitch arms and supported by the hitch arms for movement up and down with the nonpivoted ends of the arms, said hitch arms being constructed to swing the tool attached to the arms about an axis extending transversely of the tractor on pivotal movement of the arms, said ditcher tool comprising a tool frame portion detachably fixed to the arms for movement up and down therewith, said tool frame portion having an elongated substantially upright guideway which is shiftable in elevation and in angular position relative to the ground on pivotal movement of nonpivoted ends of the hitch arms, an elongated tool beam nonrotatably and slidably mounted in said guideway for reciprocal movement in a linear path up and down in said guideway, a pair of elongated and divergent moldboard sections having a convergent set of ends carried at the base of said tool beam, means joining the convergent ends of the moldboard sections defining an upright, lead cutting edge, said moldboard sections diverging laterally from each other and inclining upwardly progressing from their convergent to their divergent ends, means securing the moldboard sections to said tool beam accommodating pivotal movement of the divergent ends toward and away from each other, means interposed between the moldboard sections for fixing in various adjusted positions the spacing between the divergent ends of the moldboard sections, and an hydraulically-operated, double-acting fluid jack connected between said tool beam and tool frame portion for adjusting the position of said tool beam relative to said guideway.

References Cited in the file of this patent

UNITED STATES PATENTS

| 1,864,639 | Crezée | June 28, 1932 |
| 2,235,670 | Chattin | Mar. 18, 1941 |
| 2,544,815 | Weaver | Mar. 13, 1951 |
| 2,684,543 | Cundiff | July 27, 1954 |
| 2,755,571 | Clark | July 24, 1956 |
| 2,840,935 | Bird et al. | July 1, 1958 |

FOREIGN PATENTS

| 500,433 | Canada | Mar. 9, 1954 |